(12) United States Patent
Jongren (10) Patent No.: US 8,335,274 B2
(45) Date of Patent: Dec. 18, 2012

(54) PRECODER FOR SPATIAL MULTIPLEXING, MULTIPLE ANTENNA TRANSMITTER

(75) Inventor: George Jongren, Sockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/746,448

(22) PCT Filed: Oct. 9, 2008

(86) PCT No.: PCT/SE2008/051155
§ 371 (c)(1),
(2), (4) Date: Jun. 4, 2010

(87) PCT Pub. No.: WO2009/072960
PCT Pub. Date: Jun. 11, 2009

(65) Prior Publication Data
US 2010/0284483 A1 Nov. 11, 2010

Related U.S. Application Data

(60) Provisional application No. 60/991,849, filed on Dec. 3, 2007.

(51) Int. Cl.
*H04L 27/00* (2006.01)
(52) U.S. Cl. .................... 375/267; 375/296; 375/299
(58) Field of Classification Search .................. 375/260, 375/267, 296, 299
See application file for complete search history.

(56) References Cited

U.S. PATENT DOCUMENTS

| | | | |
|---|---|---|---|
| 2007/0071147 A1* | 3/2007 | Sampath et al. | 375/347 |
| 2008/0303701 A1* | 12/2008 | Zhang et al. | 341/106 |
| 2011/0096851 A1* | 4/2011 | Clerckx et al. | 375/259 |
| 2011/0194649 A1* | 8/2011 | Khojastepour | 375/296 |

OTHER PUBLICATIONS

"3rd Generation Partnership Project; Technical Specification Group Radio Access Network; Physical Channels and Modulation(Release 8)" 3GPP Draft; 36211-120, 3rd Generation Partnership Project (3GPP), Mobile Competence Centre , 650, Route des Lucioles , F-06921 Sophia-Antipolis Cedex, France, No. 20070600, Jul. 5, 2007, XP050088053.
Texas Instruments; "Further Details on Codebook-Based Pre-coding for E-UTRA" 3GPP Draft; R1-070270 T1 MIMO Precoding, 3rd Generation Partnership Project (3GPP), Mobile Competence Centre ; 650, Route des Lucioles ; F-06921 Sophia-Antipolis Cedex; France, vol. RAN WG1, no. Sorrento, Italy; 20070115, Jan. 10, 2007, XP050104305.

* cited by examiner

*Primary Examiner* — David B. Lugo (57) ABSTRACT

A transmitter (100) selects a transmission rank and chooses a predetermined precoder sequence for the selected transmission rank comprising one or more precoding filters derived from a single generator matrix. During transmission, a precoder (124) spatially codes data for transmission to a remote device using different ones of the precoding filters during different precoding intervals in a precoding period according to the selected precoder sequence.

26 Claims, 6 Drawing Sheets

PRECODER FOR SPATIAL MULTIPLEXING, MULTIPLE ANTENNA TRANSMITTER

TECHNICAL FIELD

The invention relates generally to methods and apparatus for transmitting signals using multiple transmit antennas and, more particularly, to methods and apparatus for spatially precoding signals transmitted from a multiple antenna transmitter.

BACKGROUND

In recent years, there has been much interest in multiple input, multiple output (MIMO) systems for enhancing data rates in mobile communication systems. MIMO systems employ multiple antennas at the transmitter and receiver to transmit and receive information. The receiver can exploit the spatial dimensions of the signal at the receiver to achieve higher spectral efficiency and higher data rates without increasing bandwidth.

One transmission scheme for MIMO systems that is receiving significant attention is spatial multiplexing. In a spatial multiplexing transmitter, the information symbols are precoded before transmission to multiplex the information signal in the spatial domain. The precoding may be channel dependent or channel independent. With channel dependent precoding, also referred to as closed loop precoding, the precoder matrix is chosen to match the characteristics of the MIMO channel. With channel independent precoding, also referred to as open-loop precoding, channel characteristics are not considered in selecting the precoder matrix.

With closed loop precoding, the user equipment performs channel measurements on the forward link channel, and feeds back channel information or precoder configurations to the base station. One problem with closed loop precoding is that it takes time to perform channel measurements and feed back information to the base station. During that time, the channel conditions may have changed so that the feedback information is outdated before it is used. Consequently, closed loop precoding is typically used in low mobility situations where the channel variations are slow.

In situations where the channel conditions vary more rapidly and lack significant long-term properties, channel independent precoding or open-loop precoding may be used. With open loop precoding, the precoding matrix is selected independent of the channel realizations. Channel independent precoding is generally considered more suitable for high mobility situations.

One way to implement open loop precoding is to use a spatial multiplexing precoder matrix to precode the information sequence prior to transmission. In order to accommodate a wide range of channel realizations, it is advantageous to apply multiple precoders that are varied in a deterministic manner known to both the transmitter and the receiver. For example, in an orthogonal frequency division multiplexing (OFDM) system, the precoder may be kept fixed for a set of one or more subcarriers and then changed for the next set of subcarriers. This technique, referred to as precoder cycling, serves to distribute the energy spatially in a more isotropic manner, which in turn is useful for diversity and reducing the tendency to bias the performance of the transmitter for a particular set of channel realizations. When applying precoder cycling, it is advantageous to have substantial precoding variation over the smallest possible allocation unit, e.g., a resource block (RB), since a codeword may potentially only span a very small set of resource elements.

A number of drawbacks have been encountered in the past when precoder cycling has been used. Interference rejection algorithms implemented at the receiver need to characterize the spatial properties of the channel to suppress interference. It is beneficial that the interfering transmissions have roughly similar properties over a large number of resource elements so that averaging may be used to suppress noise and other impairments. In systems where the cycling of the precoder is configurable, the receiver can not be sure how fast the interference changes over a resource block without a priori knowledge of the precoder sequence. Also, the precoders are frequently chosen from a codebook designed for channel dependent precoding. As a consequence, the precoders do not distribute the energy uniformly over the vector space of the MIMO channel. Finally, precoder cycling increases the computational complexity of demodulation and CQI computation. The computational complexity is bounded only by the codebook size, so the receiver needs to be designed to handle the worst case scenario.

SUMMARY

The present invention relates to a method and apparatus for spatially precoding data for transmission to a remote device over a MIMO channel. In one exemplary embodiment, the transmitter selects a transmission rank and uses a predetermined precoder sequence for the selected transmission rank comprising one or more precoder filters. During transmission, a precoder precodes data for transmission to a remote device using different precoding filters during different precoding intervals in a precoding period according to the selected precoder sequence.

The invention offers an efficient way to support open-loop MIMO transmission particularly targeting rank two or higher rank transmissions. Computational complexity for demodulation and CQI computation in the UE is reduced and the feasibility of interference rejection is improved compared to existing solutions. The increased uniformity of the transmission in the spatial domain improves the robustness of the open-loop MIMO mode. The use of a single generator matrix may result in considerable complexity savings as many of the computations for CQI and demodulation may be reused across several different ranks and when identifying the characteristics of the inter-cell interference.

DETAILED DESCRIPTION

Figure 1:
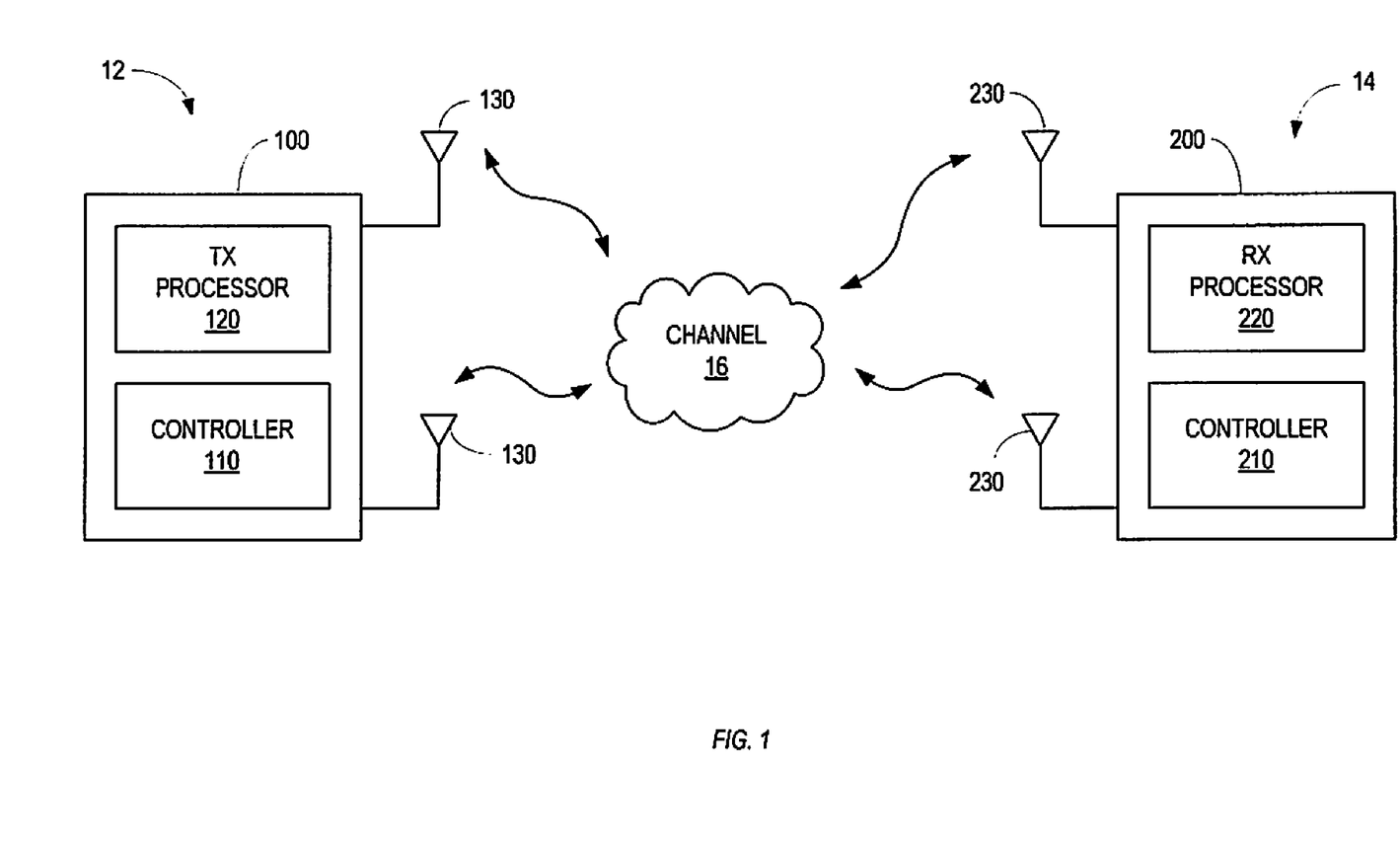
FIG. 1 illustrates an exemplary MIMO channel.

FIG. 1 illustrates a multiple input/multiple output (MIMO) wireless communication system 10 including a first station 12 and a second station 14. The first station 12 includes a transmitter 100 for transmitting signals to the second station 14 over a communication channel 16, while the second station 14 includes a receiver 200 for receiving signals transmitted by the first station 12. Those skilled in the art will appreciate that the first station 12 and second station 14 may each include both a transmitter 100 and receiver 200 for bi-directional communications. In one exemplary embodiment, the first station 12 comprises a base station in a wireless communication network, and the second station 14 comprises a user terminal. The present invention is particularly useful in Orthogonal Frequency Division Multiplexing (OFDM) systems.

An information signal in the form of a binary data stream is input to the transmitter 100 at the first station 12. The transmitter 100 includes a controller 110 to control the overall operation of the transmitter 100 and a transmit signal processor 120. The transmit signal processor 120 performs error coding, maps the input bits to complex modulation symbols, and generates transmit signals for each transmit antenna 130. After upward frequency conversion, filtering, and amplification, transmitter 100 transmits the transmit signals from respective transmit antennas 130 through the communication channel 16 to the second station 14.

The receiver 200 at the second station 14 demodulates and decodes the signals received at each antenna 230. Receiver 200 includes a controller 210 to control operation of the receiver 200 and a receive signal processor 220. The receive signal processor 220 demodulates and decodes the signal transmitted from the first station 12. The output signal from the receiver 200 comprises an estimate of the original information signal. In the absence of errors, the estimate will be the same as the original information signal input at the transmitter 12.

Because multiple data streams are transmitted in parallel from different antennas 130, there is a linear increase in throughput with every pair of antennas 130, 230 added to the system without an increase in the bandwidth requirement. MIMO systems have been the subject of extensive research activity worldwide for use in wireless communication networks because of their potential to achieve high spectral efficiencies, and therefore high data rates.

Figure 2:
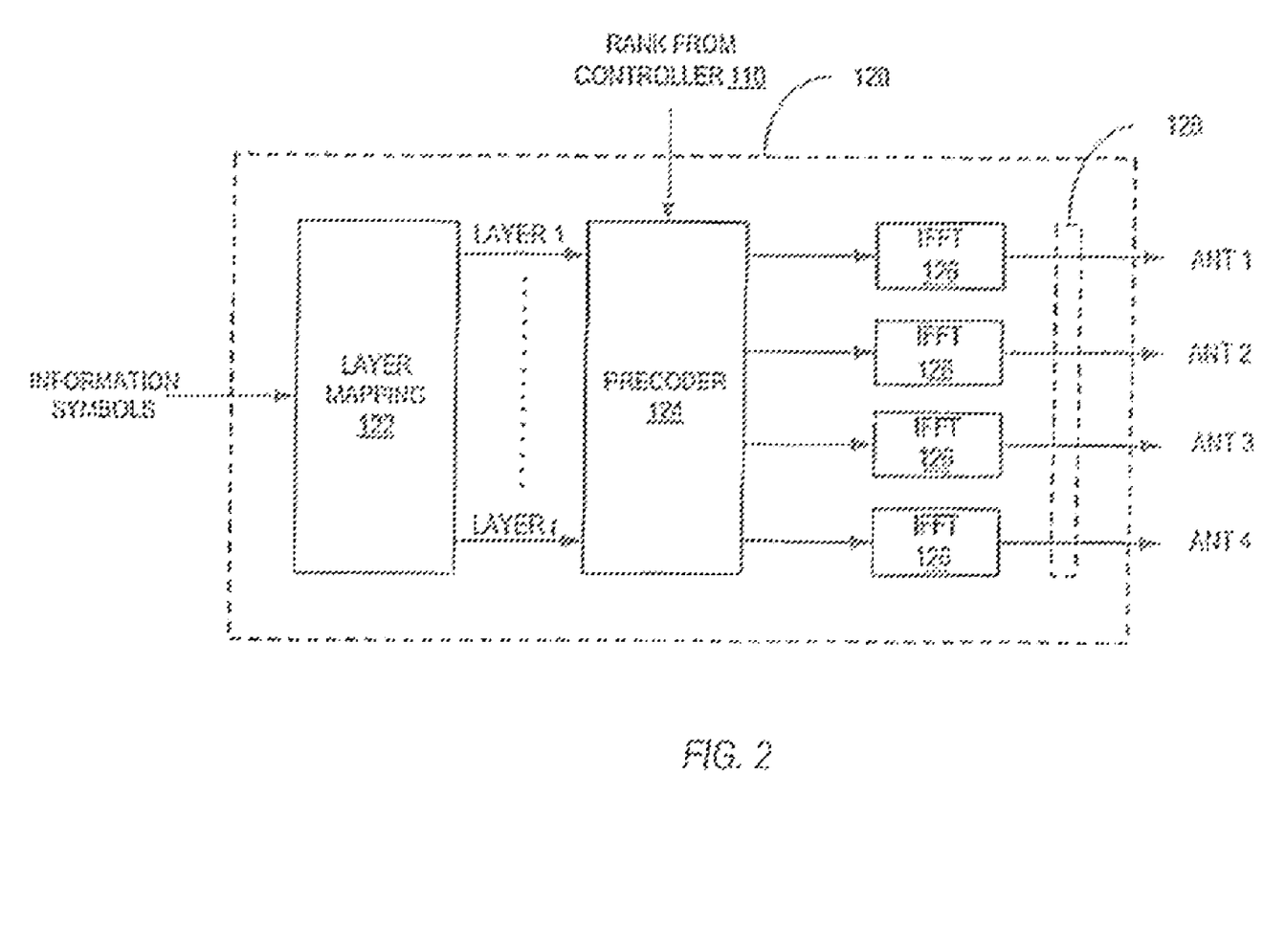
FIG. 2 illustrates an exemplary transmit signal processor for an OFDM system.

In embodiments of the present invention, the transmit signal processor 120 is configured to spatially multiplex the information signal before transmission to realize further increases in spectral efficiency by taking advantage of the spatial dimension of the communication channel 16. FIG. 2 illustrates an exemplary transmit signal processor 120 according to one embodiment of the invention for an Orthogonal Frequency Division Multiplexing (OFDM) system. The transmit signal processor 120 comprises a layer mapping unit 122, a precoder 124, and a plurality of Inverse Fast Fourier Transform (IFFT) processors 126. The IFFT processors 126 may perform a Discrete Fourier Transform or the inverse operation. A sequence of information symbols is input to the layer mapping unit 122. The symbol sequence is divided into codewords that are mapped by the transmitter 100 to corresponding OFDM symbols. The layer mapping unit 122 maps the codewords into one or more layers depending on the transmission rank. It should be noted that the number of layers does not necessarily equal the number of antennas 130. Different codewords are typically mapped to different layers; however, a single codeword may be mapped to one or more layers. The number of layers L corresponds to the selected transmission rank.

Figure 3:
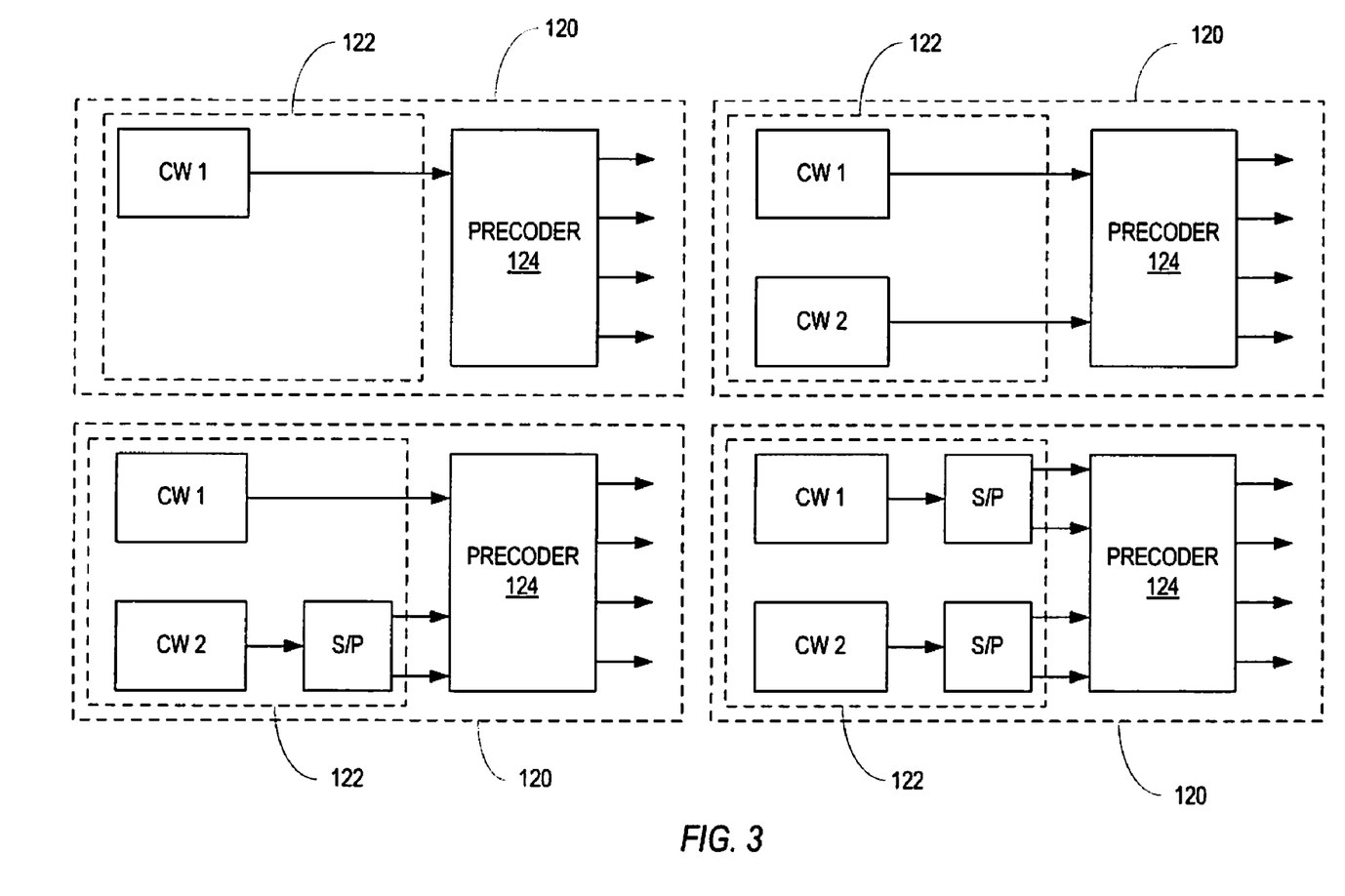
FIG. 3 illustrates the mapping of codewords to layers as performed by the transmit signal processor.

FIG. 3 illustrates the mapping of codewords to layers according to one exemplary embodiment for transmission ranks from 1 to 4. For a transmission rank of 1, a single codeword is mapped to a single layer. For a transmission rank of 2, two codewords are mapped to two different layers. For a transmission rank of 3, two codewords are mapped to three layers, and for a transmission rank of 4, two codewords are mapped to four layers. It may be noted that the transmission rank or number of layers need not be the same as the number of antennas. In the subsequent discussion, it is assumed that the transmitter 100 includes four transmit antennas 130.

Each layer output from the layer mapping unit 122 feeds into the precoder 124. Precoder 124 spatially multiplexes the symbols in each layer by multiplying a vector s of input symbols to the precoder 124 with a precoding filter. The precoding filter is an N×L matrix that multiplies each input symbol of the symbol vector s by a corresponding column vector of the precoding matrix. In order to achieve diversity, the precoder 124 cycles through multiple precoding filters and outputs N coded symbol streams. Each symbol stream is output to a corresponding IFFT processor 126. In an orthogonal OFDM system, the precoding filter may be kept fixed for a set of one or more subcarriers and then changed for the next set of subcarriers according to the selected precoder sequence. The precoding filters may be pre-stored in memory or generated on the fly by the transmit signal processor 120 as hereinafter described. The IFFT processors 126 transform the spatially coded symbols output by the precoder 124 to the frequency domain to generate OFDM symbols. The OFDM symbols output from each IFFT processor 124 are then output to a respective antenna 130 via antenna ports 128 for transmission to the receiver 200. By spatially coding the information symbols, it is possible to transmit multiple symbols on each resource element (RE) of the OFDM resource grid.

According to the present invention, precoder 124 cycles through a fixed and predetermined set of precoding filters determined based on the selected transmission rank. A precoder sequence known a priori to the base station and user terminal specifies the set of precoding filters to use for precoding and the order in which the precoding filters in the set are applied. A different precoder sequence is defined for each possible transmission rank.

The precoding filters corresponding to each precoder sequence are selected to satisfy the following criteria:
  the precoder sequence is the same for each resource block or smallest resource allocation unit;
  the precoding sequence should use the different precoding filters an equal number of times, or as close to equal as possible;
  the number of different precoding filters in the precoding sequence should be small but still distribute the subspaces sufficiently uniform over the (complex) Grassmanian manifold; and
  the number of different precoding filters corresponding to one period of the precoder sequence should be applied to resource elements which are close to one another in the resource grid.

A precoding sequence meeting these criteria is referred to as short uniformly varying precoding sequence (SUVPS).

In one exemplary embodiment, the precoding filters may be selected from a predetermined codebook. An exemplary codebook is the House Holder codebook specified in the Long Term Evolution (LTE) standard currently being developed. The House Holder codebook comprises sixteen precoding filters. For each transmission rank, four of the possible sixteen precoding filters in the House Holder codebook may be selected to form a precoder sequence with a periodicity of four. That is, each precoding filter is used once in one period of the precoder sequence. The selection should be made to optimize some predetermined criterion that strives for a uniform distribution of subspaces over the Grassmanian manifold according to some Grassmanian subspace packing principle. For example, the precoding filters may be chosen to maximize the minimum distance between subspaces, where the distance may correspond to measures such as chordal, projection two-norm, or the Fubini-Study distance.

In an orthogonal OFDM system, the precoding filter may be kept fixed for a set of one or more subcarriers and then changed for the next set of subcarriers according to the selected precoder sequence. To ensure that a period of the precoder sequence is localized in the OFDM resource grid, a precoder sequence with a periodicity of four may be applied by traversing the resource elements (REs) in a resource block (RB) of the OFDM resource grid in a zig-zag like pattern. For example, the REs may be traversed in a frequency first order from top to bottom in each odd-numbered OFDM symbol period, and from bottom to top in each even-numbered OFDM symbol period.

In one exemplary embodiment, the precoding filters in a precoding sequence are selected from column subsets of a single generator matrix. The elements of the generator matrix may, for example, be taken from an 8-PSK or QPSK alphabet. An exemplary generator matrix G for a 4 antenna transmitter is given by:

$$G = \begin{bmatrix} 1 & 1 & 1 & 1 \\ 1 & j & -1 & -j \\ 1 & -1 & 1 & -1 \\ 1 & -j & -1 & j \end{bmatrix}.$$ Eq. (1)

The precoding filters are derived from the generator matrix G by selecting column subsets in G as precoding filters. In order to meet the requirement for uniformity in the spatial properties, the column subsets are selected such that:
  all the columns in the generator matrix G are used an equal number of times in one period of the precoder sequence for a given transmission rank;
  each precoding filter is used the same number of times in one period of the precoder sequence; and
  the maximum possible period length is equal to the number of different column subsets for a given transmission rank.

Table 1 below gives exemplary precoder sequences derived from the generator matrix G for transmission ranks from 1 to 4, where $G_{[n_i K n_k]}$ denotes a filter matrix with the columns $n_i \ldots n_k$ taken from G.

TABLE 1

| Precoder Sequences for Transmission Ranks 1 to 4 | | | | | |
|---|---|---|---|---|---|
| Rank | Precoder Sequence | | | | |
| 1 | $G_{[1]}$ | $G_{[2]}$ | $G_{[3]}$ | $G_{[4]}$ | |
| 2 | $G_{[12]}$ | $G_{[34]}$ | $G_{[13]}$ | $G_{[24]}$ | $G_{[14]}$ $G_{[23]}$ |
| 3 | $G_{[123]}$ | $G_{[124]}$ | $G_{[134]}$ | $G_{[234]}$ | |
| 4 | G | | | | |

As seen in Table 1, the period of the precoder sequence for each possible transmission rank equals the number of all possible column combinations, and each precoder sequence uses each possible precoding filter exactly once. For transmission rank 2, the precoding filters are paired and ordered such that the full vector space is covered by each pair. That is the first two filters form a first pair, the next two filters form a second pair, and so forth. The pairing is advantageous where the channel varies significantly within one resource block because it is beneficial for uniformity to cover the full vector space with as little channel variations as possible.

Figure 4:
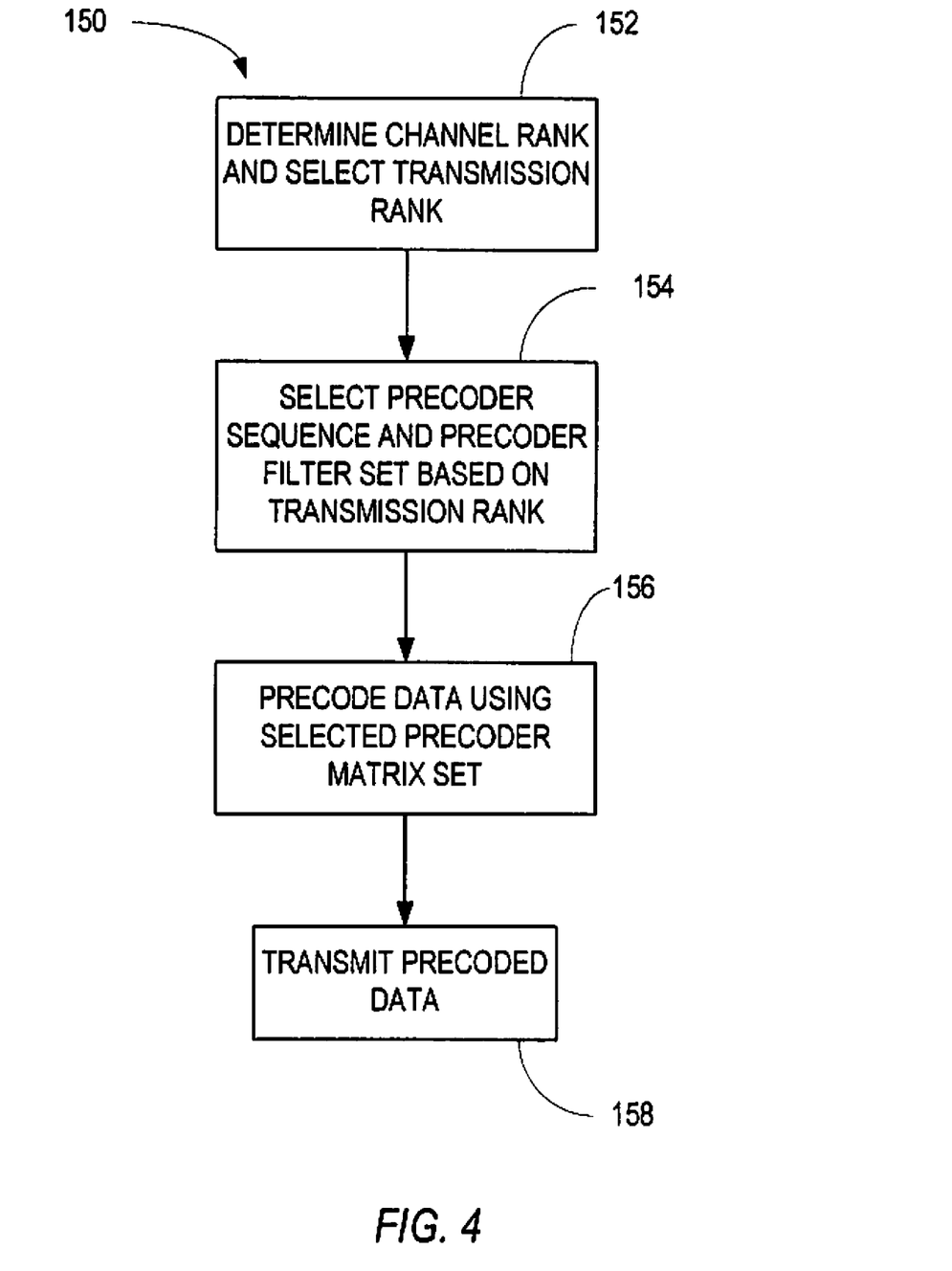
FIG. 4 illustrates an exemplary method for precoding data for transmission to a remote device.

FIG. 4 illustrates an exemplary method 150 of transmitting signals from a multiple antenna transmitter 200. The transmit controller 110 determines the rank of the channel and selects the desired transmission rank (block 152). The channel rank may be determined in a conventional manner. The transmission rank is chosen to use as many transmission layers as the channel can support. Once the transmission rank is determined, the transmit controller 110 indicates the selected transmission rank to the transmit signal processor 120. The transmit signal processor 120 selects the precoder sequence corresponding to the transmission rank (block 154). As previously noted, the precoder sequence for each possible transmission rank is known a priori to the transmitter 100. The precoder sequence determines the set of precoding filters to be used and the order in which the precoding filters are applied. The precoding filters may be pre-stored in memory. Alternatively, the generator matrix may be stored in memory and the precoding filters may be constructed on-the-fly from the generator matrix after the transmission rank is determined. With the selected set of precoding filters, the transmit signal processor 120 precodes the information symbols (block 156) and transmits the precoded symbols (block 158). During the precoding, the transmitter 100 changes or cycles the precoding filters while traversing the OFDM resource grid. For example, the precoding filter may be kept fixed for a set of one or more subcarriers and then changed for the next set of subcarrier according to the selected precoder sequence.

Figure 5:
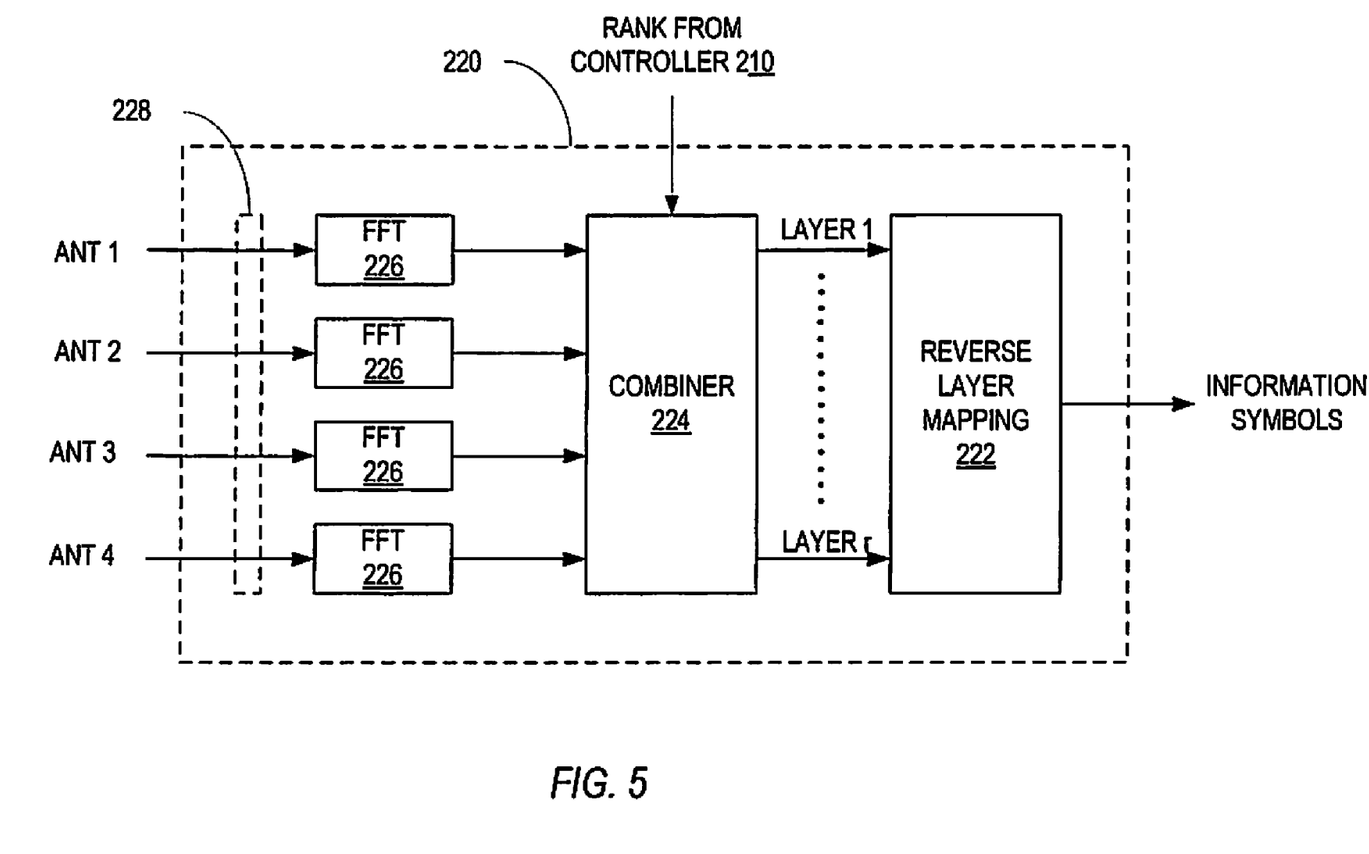
FIG. 5 illustrates an exemplary receive signal processor for an OFDM system.

FIG. 5 illustrates an exemplary receive signal processor 220 according to one embodiment of the invention for decoding signals transmitted by the transmitter 100. The receive signal processor 220 comprises a reverse layer mapping unit 222, a precoder 224, and a plurality of Fast Fourier Transform (FFT) processors 226. The FFT processors 226 may perform a Discrete Fourier Transform or the inverse operation. The signal received at each antenna port 228 is processed by a corresponding FFT processor 226. The output from each FFT processor 226 is input to combiner 224. The combiner 224 combines the outputs from each FFT processor 226 and outputs a received symbol stream corresponding to each transmitted layer. The combiner 224 uses a set of combining filters that are selected based on the transmission rank and which match the precoding filters used by the transmitter 100. The combiner 224 cycles through the set of combining filters, using a different one of the combining filters during different combining intervals. The combining intervals at the receiver correspond to precoding intervals at the transmitter 100. The symbol streams output from the combiner 224 are then combined into a single received symbol stream by the reverse layer mapping unit 222. This symbol stream may be subject to further processing, such as rate-dematching, soft buffer combining, and turbo decoding.

Figure 6:
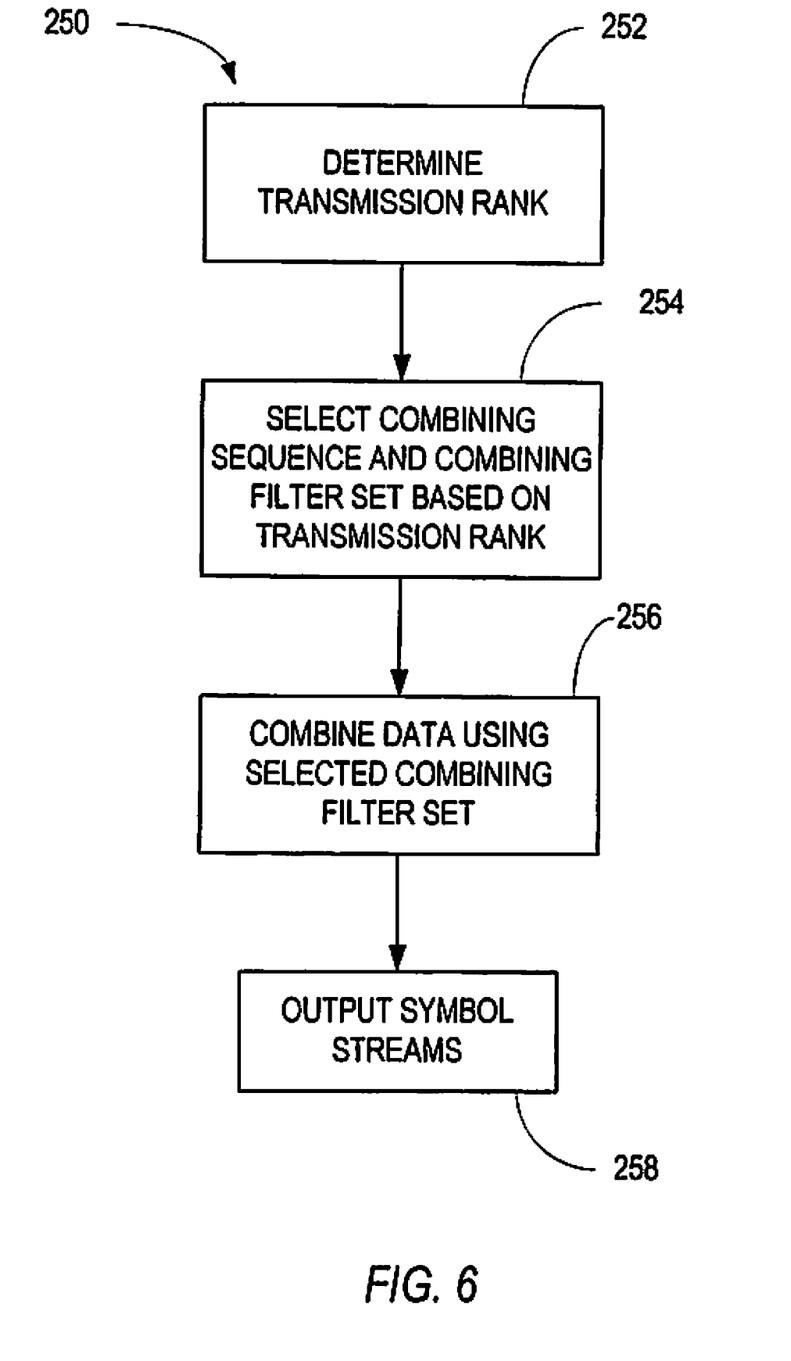
FIG. 6 illustrates an exemplary method for receiving precoded data.

FIG. 6 illustrates an exemplary method 250 of receiving signals from a multiple antenna transmitter 200. The receive controller 210 determines the transmission rank used by the transmitter 100 (block 252). The transmitter 100 may inform the receiver 100 of the transmission rank in a signaling message. Alternatively, the receiver may determine the transmission rank itself based on the channel rank. Once the transmission rank is determined, the receive controller 210 indicates the selected transmission rank to the receive signal processor 220. The receive signal processor 220 selects a combining sequence corresponding to the transmission rank, which is known a priori to the receiver 200 (block 254). The combining sequence determines the set of combining filters to be used and the order in which the combining filters are applied. The combining filters may be pre-stored in memory. Alternatively, the generator matrix may be stored in memory and the combining filters may be constructed on-the-fly from the generator matrix after the transmission rank is determined. With the selected set of combining filters, the receive signal processor 220 combines the output of each FFT processor 226 to generate a symbol stream corresponding to each layer (block 256). The symbol streams corresponding to each layer are then output to the reverse layer mapping unit 222 (block 258).

The invention offers an efficient way to support open-loop MIMO transmission particularly targeting rank two or higher rank transmissions. Computational complexity for demodulation and CQI computation in the UE is reduced and the feasibility of interference rejection is improved compared to existing solutions. The increased uniformity of the transmission in the spatial domain improves the robustness of the open-loop MIMO mode. The use of a single generator matrix may result in considerable complexity savings as many of the computations for CQI and demodulation may be reused across several different ranks and when identifying the characteristics of the inter-cell interference.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of spatially precoding data in a channel independent way, said method comprising the steps of:
   selecting a transmission rank based on a transmission rank of a communication channel;
   selecting a set of one or more precoding filters derived from a single generator matrix based on said transmission rank, wherein selecting the set of precoding filters comprises selecting one or more columns of the single generator matrix for each precoding filter, and wherein the number of columns selected for each precoding filter equals the selected transmission rank; and
   precoding data for transmission to a remote device using said precoding filters in a predetermined order according to a predetermined precoding sequence, thus using different ones of said precoding filters during different precoding intervals in a precoding period of the predetermined precoding sequence, wherein selecting the set of precoding filters further comprises selecting the set of precoding filters such that each column of the generator matrix is used a same number of times during the predetermined precoding sequence.

2. The method of claim 1, wherein selecting a set of one or more precoding filters derived from a single generator matrix based on said transmission rank further comprises selecting a set of precoding filters such that the minimum subspace distance between any two precoding filters in the set of precoding filters is maximized according to a predetermined distance criterion.

3. The method of claim 2, wherein the distance criterion comprises at least one of chordal, projection two-norm, or Fubini-Study distance.

4. The method according to claim 1, wherein said generator matrix comprises a QPSK alphabet generator matrix.

5. The method according to claim 1 applied to an Orthogonal Frequency Division Multiplexing (OFDM) system, wherein precoding data for transmission to a remote device comprises traversing an OFDM resource block in an alternating pattern during said precoding period.

6. The method of claim 5, wherein the alternating pattern comprises a frequency first order from top to bottom in even-numbered symbol periods and a frequency first order from bottom to top in odd-numbered symbol periods, or vice versa.

7. The method of claim 1, wherein the number of precoding intervals in said precoding period equals the number of possible combinations of columns for the selected transmission rank, and wherein each precoding filter in said set comprises one of said possible combination of columns from said generator matrix.

8. The method according to claim 1, wherein the ordering of said precoding filters in said precoding period is such that, for a selected transmission rank, nonoverlapping fixed-size groups of consecutively used precoding filters do not have any columns in common.

9. A transmitter for transmitting spatially precoded data in a channel independent way, comprising:
   a transmit controller configured to determine a transmission rank of said communication channel and to select a set of one or more precoding filters derived from a single generator matrix based on said transmission rank by selecting one or more columns of the single generator matrix for each precoding filter, wherein the number of columns selected for each precoding filter equals the determined transmission rank; and
   a transmit signal processor including a precoder configured to precode said data for transmission using said precoding filters in a predetermined order according to a predetermined precoding sequence, thus using different ones of said precoding filters in different precoding intervals of a precoding period of the predetermined precoding sequence, wherein the transmit controller is further configured to select the set of precoding filters by selecting the set of precoding filters such that each column of the generator matrix is used a same number of times during the predetermined precoding sequence.

10. The transmitter of claim 9, wherein the transmit signal processor is further configured to select the set of filters that maximizes a minimum subspace distance between any two precoding filters in the set according to a predetermined distance criterion.

11. The transmitter of claim 10, wherein the distance criterion comprises at least one of chordal, projection two-norm, or Fubini-Study distance.

12. The transmitter according to claim 9, wherein said generator matrix comprises a QPSK alphabet generator matrix.

13. The transmitter according to claim 9 for an Orthogonal Frequency Division Multiplexing (OFDM) system, wherein the transmit signal processor is further configured to precode data for transmission to a remote device by traversing an OFDM resource block in an alternating pattern during said precoding period.

14. The transmitter according to claim 13, wherein the alternating pattern comprises a frequency first order from top to bottom in even-numbered symbol periods and a frequency first order from bottom to top in odd-numbered symbol periods, or vice versa.

15. The transmitter of claim 9, wherein the number of precoding intervals in said precoding period equals the number of possible combinations of columns for the selected transmission rank, and wherein each precoding filter in said set comprises one of said possible combination of columns from said generator matrix.

16. The transmitter according to claim 9, wherein the transmit signal processor is further configured to apply the precoding filters in said precoding period such that, for a selected transmission rank, non-overlapping fixed-size groups of consecutively used precoding filters do not have any columns in common.

17. A method of receiving spatially precoded data, precoded in a channel independent way, received from a remote device, said method comprising the steps of:
  determining a transmission rank applied at a transmitter;
  selecting a set of one or more combining filters based on said transmission rank, wherein said combining filters corresponding to a set of precoding filters derived from a single generator matrix, wherein selecting the set of combining filters comprises selecting one or more columns of the single generator matrix for each combining filter, and wherein the number of columns selected for each combining filter equals the determined transmission rank; and,
  combining said spatially precoded data using said combining filters in a predetermined order according to a predetermined combining sequence, thus using different ones of said combining filters during different combining intervals in a combining period of the predetermined combining sequence, wherein selecting the set of combining filters further comprises selecting the set of combining filters such that each column of the single generator matrix is used a same number of times during the predetermined combining sequence.

18. The method according to claim 17 applied to an Orthogonal Frequency Division Multiplexing (OFDM) system, wherein combining said spatially precoded data comprises traversing an OFDM resource block in an alternating pattern during said combining period.

19. The method according to claim 18, wherein the alternating pattern comprises a frequency first order from top to bottom in even-numbered symbol periods and a frequency first order from bottom to top in odd-numbered symbol periods, or vice versa.

20. The method of claim 17, wherein the number of combining intervals in said combining period equals the number of possible combinations of columns for the selected transmission rank, and wherein each combining filter in said set comprises one of said possible combination of columns from said generator matrix.

21. The method according to claim 17, wherein the ordering of said combining filters in said combining period is such that, for a selected transmission rank, non-overlapping fixed-size groups of consecutively used combining filters do not have any columns in common.

22. A receiver for receiving spatially precoded data, precoded in a channel independent way, comprising:
  a receive controller configured to determine a transmission rank applied at a transmitter and to select a set of one or more combining filters derived from a single generator matrix based on said transmission rank by selecting one or more columns of the generator matrix for each combining filter, wherein the number of columns selected for each combining filter equals the transmission rank; and,
  a receive signal processor including a combiner configured to combine said spatially precoded data using said combining filters in a predetermined order according to the predetermined combining sequence, thus using different ones of said combining filters in different combining intervals in a combining period of the predetermined combining sequence, wherein the receive controller is further configured to select the set of combining filters by selecting the set of combining filters such that each column of the generator matrix is used a same number of times during the predetermined combining sequence.

23. The receiver according to claim 22 applied to an Orthogonal Frequency Division Multiplexing (OFDM) system, wherein the receive signal processor is configured to combine said precoded data while traversing an OFDM resource block in an alternating pattern during said combining period.

24. The receiver according to claim 23, wherein the alternating pattern comprises a frequency first order from top to bottom in even-numbered symbol periods and a frequency first order from bottom to top in odd-numbered symbol periods, or vice versa.

25. The receiver of claim 22, wherein the number of combining intervals in said combining period equals the number of possible combinations of columns for the selected transmission rank and wherein each combining filter in said set comprises one of said possible combination of columns from said generator matrix.

26. The receiver according to claim 22, wherein the ordering of said combining filters in said combining period is such that, for a selected transmission rank, non-overlapping fixed-size groups of consecutively used combining filters do not have any columns in common.

* * * * *

UNITED STATES PATENT AND TRADEMARK OFFICE
CERTIFICATE OF CORRECTION

PATENT NO. : 8,335,274 B2  
APPLICATION NO. : 12/746448  
DATED : December 18, 2012  
INVENTOR(S) : Jöngren Page 1 of 1

It is certified that error appears in the above-identified patent and that said Letters Patent is hereby corrected as shown below:

On the Title Page, in Item (12), under "United States Patent", in Column 1, Line 1, delete "Jongren" and insert -- Jöngren --, therefor.

On the Title Page, in Item (75), under "Inventor", in Column 1, Line 1, delete "George Jongren, Sockholm (SE)" and insert -- George Jöngren, Stockholm (SE) --, therefor.

In the Specifications

In Column 2, Line 24, delete "preceding" and insert -- precoding --, therefor.

In Column 6, Line 2, delete "transmitter 200." and insert -- transmitter 100. --, therefor.

In Column 6, Line 53, delete "transmitter 200." and insert -- transmitter 100. --, therefor.

In Column 6, Line 56, delete "receiver 100" and insert -- receiver 200 --, therefor.

Signed and Sealed this  
Fourteenth Day of May, 2013

Teresa Stanek Rea  
*Acting Director of the United States Patent and Trademark Office*